United States Patent
Patel et al.

(10) Patent No.: US 8,746,902 B2
(45) Date of Patent: Jun. 10, 2014

(54) RETROREFLECTIVE ARTICLES INCLUDING PRINTED AREAS

(75) Inventors: Suman K. Patel, Woodbury, MN (US); William D. Coggio, Hudson, WI (US); Michael L. Steiner, New Richmond, WI (US); Michael Benton Free, St. Paul, MN (US); Kenneth L. Smith, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 291 days.

(21) Appl. No.: 13/264,347

(22) PCT Filed: Apr. 15, 2010

(86) PCT No.: PCT/US2010/031278
§ 371 (c)(1),
(2), (4) Date: Oct. 13, 2011

(87) PCT Pub. No.: WO2010/121056
PCT Pub. Date: Oct. 21, 2010

(65) Prior Publication Data
US 2012/0037025 A1    Feb. 16, 2012

Related U.S. Application Data

(60) Provisional application No. 61/169,532, filed on Apr. 15, 2009, provisional application No. 61/324,298, filed on Apr. 14, 2010.

(51) Int. Cl.
*G02B 5/122* (2006.01)
(52) U.S. Cl.
USPC ............................................. 359/529

(58) Field of Classification Search
CPC ................................ G02B 5/122; G02B 5/124
USPC ................................................... 359/529, 530
See application file for complete search history.

(56) References Cited

U.S. PATENT DOCUMENTS

| | | |
|---|---|---|
| 3,712,706 A | 1/1973 | Stamm |
| 4,025,159 A | 5/1977 | McGrath |
| 4,588,258 A | 5/1986 | Hoopman |
| 4,775,219 A | 10/1988 | Appeldorn |
| 5,691,846 A | 11/1997 | Benson, Jr. |
| 5,804,610 A | 9/1998 | Hamer |
| 5,814,355 A | 9/1998 | Shusta |
| 5,854,709 A | 12/1998 | Couzin |

(Continued)

FOREIGN PATENT DOCUMENTS

| | | |
|---|---|---|
| JP | 6-186408 | 7/1994 |
| WO | WO 2011/050232 | 4/2011 |

(Continued)

OTHER PUBLICATIONS

Groh, "*What Is the Lowest Refractive Index of an Organic Polymer?*", Macromolecules, 1991, vol. 24, pp. 6660-6663, American Chemical Society.

(Continued)

*Primary Examiner* — Euncha Cherry (57) ABSTRACT

This disclosure generally relates to retroreflective articles that include a low-index material and a printed region. This disclosure also generally relates to methods of making retroreflective articles.

43 Claims, 1 Drawing Sheet

(56) References Cited

U.S. PATENT DOCUMENTS

| | | |
|---|---|---|
| 6,376,590 B2 | 4/2002 | Kolb |
| 6,470,610 B1 | 10/2002 | Northey |
| 6,656,571 B2 | 12/2003 | Benson |
| 6,917,400 B2 | 7/2005 | Nakamura |
| 6,967,053 B1 | 11/2005 | Mullen |
| 7,288,309 B2 | 10/2007 | Fleming |
| 7,382,466 B2 | 6/2008 | Hill |
| 7,422,334 B2 | 9/2008 | Smith |
| 7,611,251 B2 | 11/2009 | Thakkar |
| 7,674,523 B2 | 3/2010 | Davidson |
| 2003/0006005 A1* | 1/2003 | Northey ................ 156/290 |
| 2004/0013856 A1 | 1/2004 | Araki |
| 2010/0103521 A1 | 4/2010 | Smith |
| 2010/0265584 A1 | 10/2010 | Coggio |
| 2011/0285927 A1 | 11/2011 | Schultz |
| 2012/0021134 A1 | 1/2012 | Kolb |
| 2012/0027945 A1 | 2/2012 | Kolb |
| 2012/0037025 A1 | 2/2012 | Patel |
| 2012/0038984 A1 | 2/2012 | Patel |
| 2012/0038990 A1 | 2/2012 | Hao |

FOREIGN PATENT DOCUMENTS

| | | |
|---|---|---|
| WO | WO 2011/129831 | 10/2011 |
| WO | WO 2011/129832 | 10/2011 |
| WO | WO 2011/129833 | 10/2011 |

OTHER PUBLICATIONS

Patton, "*Paint Flow and Pigment Dispersion, Second Edition, Chapter 5, Pigment/Binder Geometry*", 1978, pp. 126-160, J. Wiley Interscience.

Sudduth, "*Modeling Cluster Voids and Pigment Distribution to Predict Properties and CPVC in Coatings. Part 1: Dry Coating Analysis*", Pigment & Resin Technology, 2008, pp. 375-388, 37(6), Materials Research and Processing, LLC, Lafayett, LA.

Brunauer, "*Adsorption of Gases in Multimolecular Layers*", J. Am. Chem. Soc., 1938, pp. 309-319, vol. 60.

Smith, Figures 2 and 3 of "*Driver-Focused Design of Retroreflective Sheeting for Traffic Signs*", 87th Annual Meeting of Transportation Research Board, Jan. 13-17, 2008, Washington, D.C.

O'Hanlon. Why Some Paints are Transparent and Others Opaque, Light and color effects in painting: Refractive Index. 2004 Natural Pigments. [Retrieved on May 26, 2010] Retrieved from the Internet: <URL: http://naturalpigments.comleducationlarticle.asp?ArticleID=8>, pp. 1-9.

"3M Reflectivity, How We See", Jan. 1, 2004, 1 page.

Schubert, E.F., et al., "Low-refractive-index materials: A new class of optical thin-film materials," phys. Stat. sol. (b) 244, No. 8, pp. 3002-3008, © 2007 WILEY-VCH Verlag GmbH & Co. KGaA, Weinheim.

* cited by examiner

RETROREFLECTIVE ARTICLES INCLUDING PRINTED AREAS

CROSS REFERENCE TO RELATED APPLICATIONS

This application is a national stage filing under 35 U.S.C. 371 of PCT/US2010/031278, filed Apr. 15, 2010, which claims priority to and benefit of U.S. Patent Application No. 61/324,298, filed Apr. 14, 2010, and U.S. Patent Application No. 61/169,532, filed Apr. 15, 2009, the disclosures of which are incorporated by reference in their entirety herein.

TECHNICAL FIELD

This disclosure generally relates to retroreflective articles that include a low-index material and a printed region. This disclosure also generally relates to methods of making retroreflective articles.

BACKGROUND

Retroreflective materials are characterized by the ability to redirect light incident on the material back toward the originating light source. This property has led to the widespread use of retroreflective sheeting for a variety of traffic and personal safety uses. Retroreflective sheeting is commonly employed in a variety of articles, for example, road signs, barricades, license plates, pavement markers and marking tape, as well as retroreflective tapes for vehicles and clothing.

Two known types of retroreflective sheeting are cube corner sheeting and microsphere-based sheeting. Microsphere-based sheeting, sometimes referred to as "beaded" sheeting, employs a multitude of microspheres typically at least partially embedded in a binder layer and having associated specular or diffuse reflecting materials (e.g., pigment particles, metal flakes or vapor coats, etc.) to retroreflect incident light. Cube corner retroreflective sheeting, sometimes referred to as "prismatic" sheeting, typically comprises a thin transparent layer having a substantially planar first surface and a second structured surface comprising a plurality of geometric structures, some or all of which include three reflective faces configured as a cube corner element.

Typically, a cube corner element includes three mutually perpendicular optical faces that intersect at a single apex. Generally, light that is incident on a corner cube element from a light source is totally internally reflected from each of the three perpendicular cube corner optical faces and is redirected back toward the light source. Presence of, for example, dirt, water and adhesive on the optical faces can prevent total internal reflection (TIR) and lead to a reduction in the retroreflected light intensity. As such, the air interface is typically protected by a sealing film, but such films typically reduce the total active area, which is the area over which retroreflection can occur. Metallized cube corners do not rely on TIR for retroreflective light, but they are typically not white enough for daytime viewing of, for example, signing applications. Furthermore, the durability of the metal coatings may also be inadequate.

SUMMARY

The present disclosure generally relates to a retroreflective article including: a retroreflective layer including multiple cube corner elements that collectively form a structured surface that is opposite a major surface; a low refractive index material adjacent to at least a portion of the structured major surface, the low refractive index material having an effective index of refraction that is less than about 1.3; and a printable material disposed on a portion of the low refractive index material.

The present disclosure generally relates to a retroreflective article including: a retroreflective layer including multiple cube corner elements that collectively form a structured surface that is opposite a major surface; a low refractive index material adjacent to at least a portion of the structured major surface to form an optically active area which retroreflects incident light; and a printable material disposed on a portion of the low refractive index material to form an optically inactive area that does not substantially retroreflect incident light.

The present disclosure generally relates to a method of forming a retroreflective article, including (1) providing a retroreflective layer including a structured surface that is opposite a major surface; (2) applying a low refractive index material adjacent to at least a portion of the structured major surface, the low refractive index material having an effective index of refraction that is below about 1.3; and (3) printing a material on a portion of the low refractive index material.

DETAILED DESCRIPTION

Figure 1:
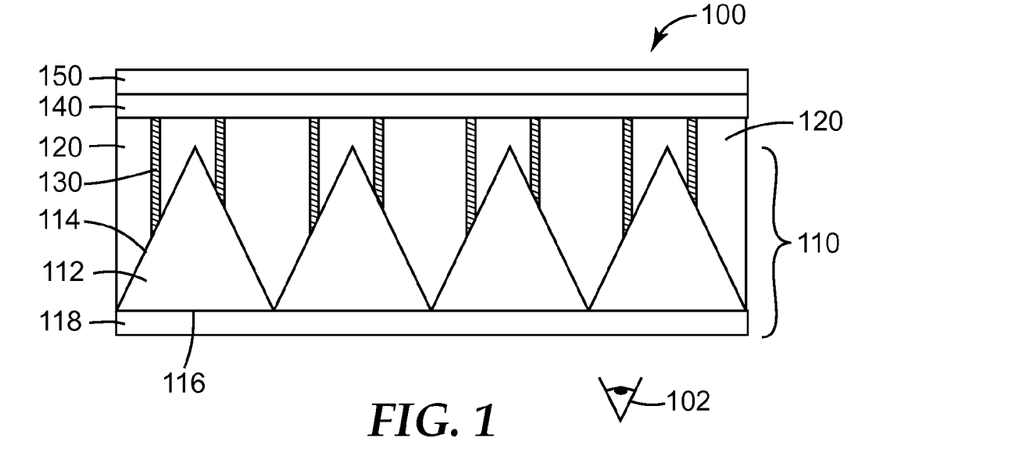
FIG. 1 is a schematic side view of an exemplary retroreflective article of the present disclosure.
Figure 2:
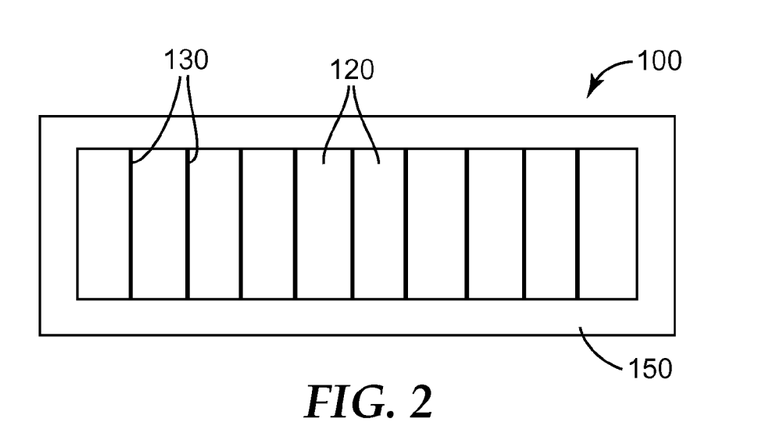
FIG. 2 is a schematic top view of one exemplary retroreflective article of the type generally shown in FIG. 1.

FIGS. 1 and 2 are a schematic side view and a schematic top view, respectively, of an exemplary retroreflective article 100 of the present disclosure. Retroreflective article 100 includes a retroreflective layer 110 that includes multiple optical elements 112 that collectively form a structured surface 114 opposite a major surface 116. Retroreflective layer 110 also includes an overlay layer 118. The embodiment shown in FIG. 1 includes overlay layer 118 and no land layer or land portion. This construction may be desirable for flexible embodiments. Those of skill in the art will appreciate that retroreflective layer 110 can alternatively include a land layer or land portion. Retroreflective article also includes multiple low refractive index areas 120, multiple printed areas 130, an adhesive layer 140, and a substrate 150. Low refractive index areas 120 include a low refractive index material that has a refractive index of less than 1.3, of less than 1.25, of less than 1.2, of less than 1.15, of less than 1.1. Low refractive index areas 120 also include pores. Print areas 130 of FIG. 1 are shown to contact structured surface 114, but in other embodiments print areas 130 do not extend to structured surface 114. In some embodiments, the low index coating material is applied at a sufficient thickness to effectively planarize the construction.

A light ray 150 incident on a portion of cube corner element 112 that is adjacent to a low refractive index area 120 is retroreflected back to viewer 102. For this reason, an area of retroreflective article 100 that includes low refractive index area 120 is referred to as an optically active area. In contrast, an area of retroreflective article 100 that is adjacent to a printed area 130 is referred to as an optically inactive area because it does not substantially retroreflect incident light. In at least some embodiments, an area is optically inactive when the print area extends to the structured surface 114. That is, areas adjacent to printed areas in which the printed area does not extend to the structured surface will still be optically active.

Retroreflective article 100 of FIGS. 1 and 2 can be made by the following exemplary process. A low refractive index material is applied to a structured major surface of a retroreflective layer. Then, a printable material is applied onto the low index material. The printable material at least partially penetrates and fills at least some of the pores in the low refractive index material to form print areas 130. The printable material can be applied to the construction using contact or non-contact methods. The method of application can include printing, including, for example, a non-contact method such as, for example, printing using an inkjet printer. The method of printing can be a contact printing method such as, for example, flexographic printing. The printing method may be continuous or non-continuous. Exemplary continuous printing methods include flood coating, Mayer rod, and slot coating. Exemplary non-continuous printing methods include screen printing, gravure printing, spray coating. Additional exemplary printing processes include, for example, ink jet printing, flexographic printing, gravure printing (direct and indirect), screen printing, transfer printing, slot printing, knife coating, roll coating or printing, spray coating or printing, dip coating, and offset printing.

In some embodiments, print areas 130 form a pattern or are applied to form a pattern. The pattern can be either regular or irregular. In general, any desired pattern can be generated by combinations of the described techniques, including, for example, indicia such as letters, words, alphanumerics, symbols, or even pictures. The patterns can also be continuous, discontinuous, monotonic, serpentine, any smoothly varying function, stripes, varying in the machine direction, the transverse direction, or both; the pattern can form an image, logo, or text, and the pattern can include patterned coatings and/or perforations. In some embodiments, the printed areas and/or unprinted areas can form a security feature. In some embodiments, the printed areas act as a reinforcing layer. The size of the printed seal pattern can be varied to create a less obvious or more obvious pattern. The amount and type of printable material and the pattern used can be varied to improve the efficiency of the water hold out and the overall ply adhesion. In some embodiments, at least 40%, at least 50%, or at least 60% of the retroreflective article is retroreflective.

Figure 3:
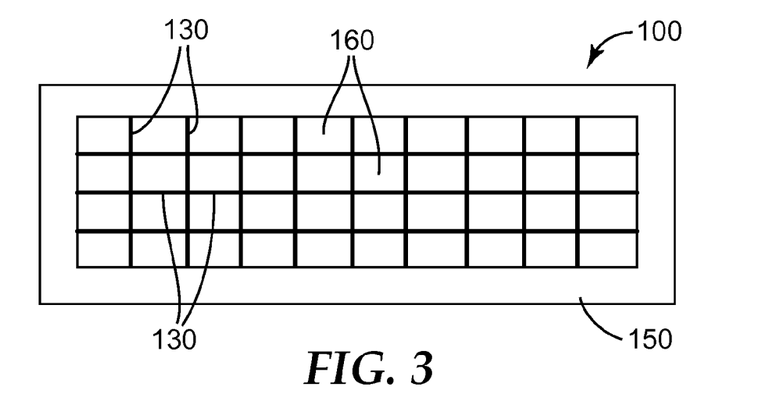
FIG. 3 is a schematic top view of an alternative exemplary retroreflective article of the type generally shown in FIG. 1.

In some embodiments, adjacent printed areas 130 form enclosed cells 160, as is shown schematically in FIG. 3. Enclosed cells may be particularly beneficial because they are protected by the printed areas from environmental exposure to materials such as water. Where retroreflective article 100 includes a protective layer over enclosed cells 160, the cells are encapsulated cells. In some embodiments, the cell size is less than 1000 microns, less than 750 microns, less than 500 microns, or less than 250 microns. The size of polygon-shaped cell is typically the distance between two opposed surfaces. The size of a round cell is the diameter of the cell. The size of a randomly shaped cell can be measured by dividing the area of the cell by the perimeter. Microsealed cell geometries, shapes, sizes and structures may be uniform across the sheeting or may be varied in a controlled manner. Variations in cell geometry such as size, shape, and cell width can be used to intentionally introduce slight fluctuations in visual appearance at close distances (below 20 feet and preferably below 5 feet). Such fluctuations can have the effect of hiding occasionally defects which might be randomly distributed in the sheeting (contaminants, coating flaws, etc) or alternatively which might result from periodic structures in the tooling or product (for example, scale up or weld lines).

The printable materials appropriate for use in the retroreflective articles of the present disclosure have a refractive index that is greater than 1.3. In some embodiments, the printable materials are inks or dyes, including any color ink (e.g., clear, white, yellow, black). In some embodiments, the printable materials are transparent, opaque, or colored. In some embodiments, the printable materials include monomers, oligimers, and/or polymers. Exemplary printable materials include radiation curable compositions, solvent based polymer solutions, and UV curable compositions. In some embodiments, the printable materials are in intimate contact with or are directly adjacent to the structured surface. In some embodiments, the printable material is disposed on at least 50%, at least 60%, at least 70%, at least 80%, and at least 90% of the structured surface. In some embodiments, the printable material is a solvent that causes the pores to collapse and/or fuse after drying. In some embodiments, heat or pressure can be selectively used in specific areas to create the higher index areas. In such embodiments, the pores may be collapsed to form areas with a higher refractive index. Such embodiments would show improved adhesion, etc.

In some embodiments, such as in the exemplary retroreflective article 100, each retroreflective optical element 112 is in the form of a tetrahedron or a pyramid, such as a regular tetrahedron or pyramid, having three planar facets or sides and a base, where the sides meet at an apex. However, the optical elements can be of any shape that provides efficient reflection or retroreflection. The dihedral angle between any two facets may vary depending on the properties desired. In some embodiments, the dihedral angle between any two facets is 90 degrees. In such embodiments, the facets are substantially perpendicular to one another (as in the corner of a room) and the optical element may be referred to as a cube corner element. In some embodiments, the dihedral angle between adjacent facets can deviate from 90° as described, for example, in U.S. Pat. No. 4,775,219, the disclosure of which is incorporated in its entirety herein by reference. In some embodiments, the optical elements can be truncated cube corners. In some embodiments, the optical elements can be full cubes or preferred geometry (PG) cubes as described in, for example, U.S. Pat. No. 7,422,334, the disclosure of which is incorporated in its entirety herein by reference. Each retroreflective optical element includes a symmetry axis that makes equal angles with facets. In some embodiments, such as in the exemplary construction 100, a symmetry axis is perpendicular to a base or a front surface. In some alternative embodiments, the symmetry axis is not perpendicular to the base or the front surface. In such embodiments, the apex of the optical element may be canted as described, for example, in U.S. Pat. No. 4,588,258, the disclosure of which is incorporated in its entirety herein by reference. The apex can also be referred to as an optical element tip.

The principle operation of a retroreflective cube corner is well known and is described, for example, in J. Optical Soc. of America 46(7), 496 (1958). In sum, a light ray propagating along the positive y-direction and incident on a retroreflective optical element, is TIR by each of the facets of the optical element resulting in a retroreflected light ray propagating along the negative y-direction and parallel to incident light ray. In some embodiments, the retroreflected light ray deviates from the y-direction as retroreflected light ray making a divergence angle $\delta$ with the y-axis. In some embodiments, such as in the case of a road sign, the divergence angle $\delta$ is in a range from about 0.2 degrees to about 2 degrees. Any breakdown of TIR can substantially reduce the intensity of the retroreflected light ray.

The coefficient of retroreflection $R_A$, sometimes referred to as the retroreflectivity, of retroreflective article 100 can vary depending on the properties desired in a specific application. In some embodiments, $R_A$ meets the ASTM D4956-07e1 standards at 0 degree and 90 degree orientation angles. In some embodiments, $R_A$ is in a range from about 5 cd/(lux·m²) to about 1500 cd/(lux·m²) when measured at 0.2 degree observation angle and +5 degree entrance angle according to ASTM E-810 test method or CIE 54.2; 2001 test method. In some embodiments, such as in embodiments where retroreflective article 100 is used in a traffic control sign, a delineator, or a barricade, $R_A$ is at least about 330 cd/(lux·m²), or at least about 500 cd/(lux·m²), or at least about 700 cd/(lux·m²) as measured according to ASTM E-810 test method or CIE 54.2; 2001 test method at 0.2 degree observation angle and +5 degree entrance angle. In some embodiments, the retroreflective structured major surface exhibits a coefficient of retroreflection $R_A$ that is not less than (or is greater than) about 40 cd/(lux·m²), or greater than about 100 cd/(lux·m²), or greater than about 150 cd/(lux·m²), or greater than about 200 cd/(lux·m²), or greater than about 250 cd/(lux·m²), or greater than about 300 cd/(lux·m²), or greater than about 350 cd/(lux·m²), or greater than about 400 cd/(lux·m²), for an observation angle of about 0.2 degrees and an entrance angle of about −4 degrees.

In some embodiments, such as in motor vehicle related application, $R_A$ is at least about 60 cd/(lux·m²), or at least about 80 cd/(lux·m²), or at least about 100 cd/(lux·m²) as measured according to ASTM E-810 test method or CIE 54.2; 2001 test method at 0.2 degree observation angle and +5 degree entrance angle.

Total light return (TLR) for retroreflective article 100 can be determined from a knowledge of percent active area and ray intensity. Ray intensity can be reduced by front surface losses and by reflection from each of the three cube corner surfaces for a retroreflected ray. Total light return is defined as the product of percent active area and ray intensity, or a percentage of the total incident light which is retroreflected. A discussion of total light return for directly machined cube corner arrays is described in, for example, U.S. Pat. No. 3,712,706 (Stamm), which is herein incorporated by reference in its entirety. The total light return is further described in Provisional U.S. Patent Application No. 61/107,586, filed Oct. 22, 2008, incorporated herein by reference in its entirety. In some embodiments, the retroreflective surface exhibits a total light return that is not less than (or that is greater than) about 5%, or greater than about 10%, or greater than about 15%, or greater than about 20%, or greater than about 25%, or greater than about 30%, for incident visible light at an entrance angle of about −4 degrees.

Exemplary low refractive index materials have an index of refraction that is less than 1.3. In some embodiments, the low refractive index material is adjacent to substantially all of the structured major surface. In other embodiments, the low refractive index material is adjacent to only a portion of the structured surface.

Some embodiments of the retroreflective articles or constructions of the present disclosure include one or more low refractive index layers, regions, or portions that support total internal reflection (TIR) or enhanced internal reflection (EIR) by virtue of including a plurality of voids. When light that travels in an optically clear non-porous medium is incident on a stratum possessing high porosity, the reflectivity of the incident light is much higher at oblique angles than at normal incidence. In the case of no or low haze voided films, the reflectivity at oblique angles greater than the critical angle is close to about 100%. In such embodiments, the incident light undergoes TIR. In the case of high haze voided films, the oblique angle reflectivity can be close to 100% over a similar range of incident angles even though the light may not undergo TIR. This enhanced reflectivity for high haze films is similar to TIR and is designated as EIR. As used herein, by a porous or voided low refractive index layer EIR, it is meant that the reflectance at the boundary of the voided and non-voided strata of the film or film laminate or layer is greater with the voids than without the voids.

Some embodiments of the retroreflective articles or constructions of the present disclosure include one or more low refractive index layers that include a plurality of voids dispersed in a binder. The voids have an index of refraction $n_v$ and a permittivity $\epsilon_v$, where $n_v^2 = \epsilon_v$, and the binder has an index of refraction $n_b$ and a permittivity $\epsilon_b$, where $n_b^2 = \epsilon_b$. In general, the interaction of a low refractive index layer with light, such as light that is incident on, or propagates in, the low refractive index layer, depends on a number of film or layer characteristics such as, for example, the film or layer thickness, the binder index, the void or pore index, the pore shape and size, the spatial distribution of the pores, and the wavelength of light. In some embodiments, light that is incident on or propagates within the low refractive index layer, "sees" or "experiences" an effective permittivity $\epsilon_{eff}$ and an effective index $n_{eff}$, where $n_{eff}$ can be expressed in terms of the void index $n_v$, the binder index $n_b$, and the void porosity or volume fraction "f". In such embodiments, the low refractive index layer is sufficiently thick and the voids are sufficiently small so that light cannot resolve the shape and features of a single or isolated void. In such embodiments, the size of at least a majority of the voids, such as at least 60% or 70% or 80% or 90% of the voids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light. In some embodiments, some of the voids can be sufficiently small so that their primary optical effect is to reduce the effective index, while some other voids can reduce the effective index and scatter light, while still some other voids can be sufficiently large so that their primary optical effect is to scatter light.

In some embodiments, the light that is incident on a low refractive index layer is visible light, meaning that the wavelength of the light is in the visible range of the electromagnetic spectrum. In such embodiments, the visible light has a wavelength that is in a range of from about 380 nm to about 750 nm, or from about 400 nm to about 700 nm, or from about 420 nm to about 680 nm. In such embodiments, the low refractive index layer has an effective index of refraction and includes a plurality of voids if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some embodiments, the low refractive index layer is sufficiently thick so that the low refractive index layer has an effective index that can be expressed in terms of the indices of refraction of the voids and the binder, and the void or pore volume fraction or porosity. In such embodiments, the thickness of the optical film or low refractive index layer is not less than about 100 nm, or not less than about 200 nm, or not less than about 500 nm, or not less than about 700 nm, or not less than about 1,000 nm. In such embodiments, the effective index of the low refractive index layer is the volume weighted average of the indices of refraction of the voids and the binder. Under ambient conditions, the voids contain air, and thus the refractive index $n_v$ for the voids is approximately 1.00. For example, a low refractive index layer that has a void volume fraction of about 50% and a binder that has an index of refraction of about 1.5, has an effective index of about 1.25.

Low refractive index layer 120 can be any optical layer that promotes or maintains TIR or enhances internal reflection at the interface with retroreflective layer 110. Low refractive index layer 120 has a sufficiently low index of refraction so as to maintain or support TIR resulting in efficient retroreflection by retroreflective layer 110. Low refractive index layer 120 can be made of any material that supports these goals. In some embodiments, the effective index of refraction of low refractive index layer 120 is not greater than (or is less than) about 1.3, or less than about 1.25, or less than about 1.2, or less than about 1.15, or less than about 1.1. In some embodiments, the refractive index is between about 1.14 and about 1.30. Some embodiments of the low index refractive layer are preferably sufficiently porous to promote or maintain TIR or enhance internal reflection. In some embodiments, low refractive index layer 120 includes a binder, a plurality of particles, and a plurality of interconnected voids or a network of interconnected voids. In other embodiments, low refractive index layer 120 includes a binder and a plurality of interconnected voids or a network of interconnected voids.

A plurality of interconnected voids or a network of interconnected voids can occur by one of two main methods as disclosed herein. In one process, the inherent porosity of highly structured, high surface area fumed metal oxides, such as fumed silica oxides, is exploited in a mixture of binder to form a composite structure that combines binder, particles, voids and optionally crosslinkers or other adjuvant materials. In another process, voids are formed in-situ from a binder, crosslinker mixture and optionally a particle followed by curing. This process "gels" the components in a solvated state to form a saturated gel which results in an in-situ porosity formation when the gel is completely dried and crosslinked. The desirable binder to particle ratio is dependent upon the type of process used to form the interconnected voided structure.

While a binder resin is not a prerequisite for the porous fumed silica structure to form, it is typically desirable to incorporate some type of polymeric resin or binder in with the metal oxide network to improve the processing, coating quality, adhesion and durability of the final construction. Examples of useful binder resins are those derived from thermosetting, thermoplastic and UV curable polymers. Examples include polyvinylalcohol, (PVA), polyvinylbutyral (PVB), polyvinyl pyrrolidone (PVP), polyethylene vinyl acetate copolymers (EVA), cellulose acetate butyrate (CAB) polyurethanes (PURs), polymethylmethacrylate (PMMA), polyacrylates, epoxies, silicones and fluoropolymers, Examples of commercially available binders useful in the mixtures are those available form Kuraray-USA, Wacker Chemical, Dyneon LLC. Although the binder can be a polymeric system, it can also be added as a polymerizable monomeric system, such as a UV, or thermally curable or crosslinkable system. Examples of such systems would be UV polymerizable acrylates, methacrylates, multi-functional acrylates, urethane-acrylates, and mixtures thereof. Some typical examples would be 1,6 hexane diol diacrylate, trimethylol propane triacrylates, pentaerythritol triacrylate. Such UV active systems are well known and readily available from such suppliers as Ato-Fina, or Sartomers.

The polymeric binders can also be formulated with cross linkers that can chemically bond with the polymeric binder to form a crosslinked network. Although the formation of crosslinks is not a prerequisite for the formation of the porous structure or the low refractive index optical properties, it is often desirable for other functional reasons such as to improve the cohesive strength of the coating, adhesion to the substrate or moisture, thermal and solvent resistance. The specific type of crosslinker is dependent upon the binder used. Typical crosslinkers for polymeric binders such as PVA would be diisocyanates, titanates such as TYZOR-LA™ (available from DuPont, Wilmington, Del.), boric acid, diepoxides diacids and the like.

The polymeric binders may form a separate phase with the particle aggregates or may be inter-dispersed between the particle aggregates in a manner to "bind" the aggregates together into a structures connecting with the metal oxidize particles through direct covalent bond formation or molecular interactions such as ionic, dipole, van Der Waals forces and physical entanglements with the metal oxides.

Exemplary particles include fumed metal oxides or pyrogenic metal oxides, such as, for example, a fumed silica or alumina. In some embodiments, particles that are highly branched or structured may be used. Such particles prevent efficient packing in the binder matrix and allow interstitial voids or pores to form. Exemplary materials including highly branched or structured particles include Cabo-Sie™ fumed silicas or silica dispersions, such as, for example, those sold under trade designations EH5, TS 520, or pre-dispersed fumed silica particles such as those available as Cabo-Sperse™ PG 001, PG 002, PG 022, 1020K, 1015. Fumed alumina oxides are also useful structured particles to form a low refractive index system although silica is preferred since it has an inherent by lower skeletal refractive index than alumina. Examples of alumina oxide are available under the trade name Cabo-Sperse, such as, for example, those sold under the trade designation Carbo-Sperse™ PG003 or Cabot Spec-Al™. Non-white particles can also be used, such as, for examples, certain dispersible carbon blacks, such as, for example, those available from Cabot under the trade name Vulcan™ XC72R. Non-white particles may have the added optical benefit of showing one color in transmission but being highly retroreflective. In some embodiments, aggregates of these exemplary fumed metal oxides comprise a plurality of primary particles in the range of about 8 nm to about 20 nm and form a highly branched structure with a wide distribution of sizes ranging from about 80 nm to greater than 300 nm. In some embodiments, these aggregates pack randomly in a unit volume of a coating to form a mesoporous structure with complex bi-continuous network of channels, tunnels, and pores which entrap air in the network and thus lower the density and refractive index of the coating.

Fumed silica particles can also be treated with a surface treatment agent. Surface-treatment of the metal oxide particles can provide, for example, improved dispersion in the polymeric binder, altered surface properties, enhanced particle-binder interactions, and/or reactivity. In some embodiments, the surface-treatment stabilizes the particles so that the particles are well dispersed in the binder, resulting in a substantially more homogeneous composition. The incorporation of surface modified inorganic particles can be tailored, for example, to enhance covalent bonding of the particles to the binder and to thereby provide a more durable and more homogeneous polymer/particle network.

The preferred type of treatment agent is determined, in part, by the chemical nature of the metal oxide surface. Silanes are preferred for silica and other for siliceous fillers. In the case of silanes, it may be preferred to react the silanes with the particle surface before incorporation into the binder. The required amount of surface modifier is dependant upon several factors such as, for example, particle size, particle type, modifier molecular weight, and/or modifier type. The silane modifier can have reactive groups that form covalent bonds between particles and the binder such as, for example, carboxy, alcohol, isocynanate, acryloxy, epoxy, thiol or amines. Conversely, the silane modifier can have non-reactive groups, such as, for example, alkyl, alkloxy, phenyl, phenyloxy, polyethers, or mixtures thereof. Such non-reactive groups may modify the surface of the coatings to improve, for example, soil and dirt resistance or to improve static dissipation. Commercially available examples of a surface modified silica particle include, for example, Cabo-Sil™ TS 720 and TS 530. It may sometimes be desirable to incorporate a mixture of functional and non-function groups on the surface of the particles to obtain a combination of these desirable features.

Representative embodiments of surface treatment agents suitable for use in the compositions of the present disclosure include, for example, N-(3-triethoxysilylpropyl) methoxyethoxyethoxyethyl carbamate, N-(3-triethoxysilylpropyl) methoxyethoxyethoxyethyl carbamate, 3-(methacryloyloxy) propyltrimethoxysilane, 3-acryloxypropyltrimethoxysilane, 3-(methacryloyloxy)propyltriethoxysilane, 3-(methacryloyloxy) propylmethyldimethoxysilane, 3-(acryloyloxypropyl) methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy) ethoxy]acetic acid (MEEAA), beta-carboxyethylacrylate (BCEA), 2-(2-methoxyethoxy)acetic acid, methoxyphenyl acetic acid, and mixtures thereof.

Particle volume concentration (PVC) and critical particle volume concentration (CPVC) can be used to characterize the porosity of a coating. The terms PVC and CPVC are well defined terms in the paint and pigment literature and are further defined well referenced articles and technical books, such as, for example "*Paint Flow and Pigment Dispersion*", Patton, T. C., $2^{nd}$ Edition, J. Wiley Interscience, 1978, Chapter 5, p. 126 and "*Modeling Cluster Voids and Pigment Distribution to Predict Properties and CPVC in Coatings. Part 1: Dry Coating Analysis*" and Sudduth, R. D; *Pigment and Resin Technology*, 2008, 37(6). p. 375.) When the volume concentration of the particles is larger than CPVC, the coating is porous since there is not enough binder to fill all the gaps between the particles and the interstitial regions of the coating. The coating then becomes a mixture of binder, particles, and voids. The volume concentration at which this occurs is related to particle size and particle structure and/or shape. Formulations with volume concentrations above CPVC have a volume deficiency of resin in the mixture that is replaced by air. The relationship between CPVC, PVC and porosity is:

$$\text{Porosity} = 1 - \frac{CPVC}{PVC}$$

As used in this discussion of CPVC, the term "pigment" is equivalent to particles and the term "resin" is equivalent to binder. In certain binder-particle systems, when the volume concentration of the particles exceeds a critical value known, as the CPVC, the mixture becomes porous. Thus the coating becomes essentially a mixture of binder, particles, and air, because there is insufficient binder to fill all the gaps between the particles and the interstitial regions of the coating. When this occurs, the volume concentration is related to at least one of the pigment particle size distribution, wetting, and the particle structure or shape. Materials that provide desired low refractive index properties have submicron pores derived from particle-binder mixtures that are highly structured and formulated above their CPVC. In some embodiments, retroreflective articles have CPVC values that are not greater than (or are less than) about 60%, or less than about 50%, or less than about 40%.

As described above, particles that are highly branched or structured prevent efficient packing in the binder matrix and allow interstitial voids or pores to form. In contrast, material combinations which fall below the desired CPVC will not be sufficiently porous. The BET method (described above) may be helpful in determining CPVC and thus porosity of low index materials because the BET method analyzes pores which are less than 200 nm in diameter, less than 100 nm in diameter, or even less than 10 nm in diameter. BET data can assist in the characterization of materials that meet minimum requirements for forming a porous structure.

The volume concentration of the particles described by the PVC/CPVC relationship is also related to the weight concentration of the particles. Therefore it is possible to establish particle weight ranges that are above the CPVC. The use of weight ratio or weight percent is one way to formulate mixtures with the desirable CPVC values. For the retroreflective articles of the present disclosure, weight ratios of binder to particle from 1:1 to 1:8 are desirable. A weight ratio of 1:1 is the equivalent of about 50 wt % particle where as 1:8 is equivalent to about 89 wt % particle. Exemplary binder to metal oxide particle ratios are less than 1:2 (less than 33% binder), less than 1:3, less than 1:4, less than 1:5, less than 1:6, less than 1:7, less than 1:8, less than 1:9, and less than 1:10 (about 8-10% binder). The lower limit of binder may be dictated by the desired refractive index. The lower limit of binder may be dictated by the desired physical properties, e.g., processing or final durability characteristics. Thus the binder to particle ratio will vary depending on the desired end use and the desired retroreflective article properties.

Generally, in one process typically referred to herein as the "GEL" process, first a solution is prepared that includes a plurality of particles, such as nano-particles, and a polymerizable material dissolved in a solvent, where the polymerizable material can include, for example, one or more types of monomers. Next, the polymerizable material is polymerized, for example by applying heat or light, to form an insoluble polymer matrix in the solvent. As the polymerization occurs, the solvent solubility (in the cured matrix) decreases and can phase separate from the matrix. This results in a matrix-rich network and phase separated solvent-rich network. The solvent is subsequently removed leaving pores and voids which yield the porous coating. The extent and type of phase separation is a primary factor in determining the morphology and topography of the film. The final structure is also dependent on the mechanical properties of the matrix network. The network modulus and strength should be sufficient to maintain a void space as the solvent is removed. The composition and extent of cure are factors in determining the morphology.

Alternatively, the low refractive index layer can include a patterned low refractive index layer that has regions that include variations in refractive index, haze, transmission, clarity, or a combination thereof. In some embodiments, the low refractive index layer includes a binder and a plurality of nanovoids. In another embodiment, the optical construction includes a substrate and a low refractive index layer disposed on the substrate. The low refractive index layer includes a binder and a plurality of nanovoids. In yet another embodiment, the optical construction includes a substrate and a low refractive index layer disposed on the substrate. In yet another embodiment, the optical construction includes a low refractive index layer that includes disposing a solution on a substrate to form a coating, the coating including a polymerizable binder and a solvent; selectively polymerizing a first portion of the coating to form an insoluble polymer matrix in the solvent; removing a major portion of the solvent from the coating; and polymerizing a second portion of the coating adjacent the first portion.

Voids have a size $d_1$ that can generally be controlled by choosing suitable composition and fabrication techniques, such as the various coating, drying, and curing conditions. In general, $d_1$ can be any desired value in any desired range of values. For example, in some embodiments, at least a majority of the voids, such as at least 60% or 70% or 80% or 90% or 95% of the voids, have a size that is in a desired range. For example, in some embodiments, at least a majority of the voids, such as at least 60% or 70% or 80% or 90% or 95% of the voids, have a size that is not greater than about 10 microns, or not greater than about 7 microns, or not greater than about 5 microns, or not greater than about 4 microns, or not greater than about 3 microns, or not greater than about 2 microns, or not greater than about 1 micron, or not greater than about 0.7 microns, or not greater than about 0.5 microns. In some embodiments, a plurality of interconnected voids has an average void or pore size that is not greater than about 5 microns, or not greater than about 4 microns, or not greater than about 3 microns, or not greater than about 2 microns, or not greater than about 1 micron, or not greater than about 0.7 microns, or not greater than about 0.5 microns.

In some embodiments, the index of refraction $n_1$ of the particles can be sufficiently close to the index $n_b$ of binder, so that the effective index does not depend, or depends very little, on the index of refraction of the particles. In such embodiments, the difference between $n_1$ and $n_b$ is not greater than about 0.01, or not greater than about 0.007, or not greater than about 0.005, or not greater than about 0.003, or not greater than about 0.002, or not greater than about 0.001. In some embodiments, particles are sufficiently small and their index is sufficiently close to the index of the binder, that the particles do not primarily scatter light or affect the index. In such embodiments, the primary effect of the particles can, for example, be to enhance the strength of low refractive index layer. In some embodiments, particles can enhance the process of making the low refractive index layer, although low refractive index layer can be made with no particles.

In general, low refractive index layer can have any porosity, pore-size distribution, or void volume fraction that may be desirable in an application. In some embodiments, the volume fraction of plurality of the voids in the low refractive index layer is not less than about 20%, or not less than about 30%, or not less than about 40%, or not less than about 50%, or not less than about 60%, or not less than about 70%, or not less than about 80%, or not less than about 90%.

In some embodiments, portions of the low refractive index layer can manifest some low-index properties, even if the low refractive index layer has a high optical haze and/or diffuse reflectance. For example, in such embodiments, the portions of the low refractive index layer can support TIR at angles that correspond to an index that is smaller than the index $n_b$ of the binder.

In the exemplary low refractive index layer, the particles can be solid particles. In some embodiments, low refractive index layer may additionally or alternatively include a plurality of hollow or porous particles. The particles can be any type particles that may be desirable in an application. For example, the particles can be organic or inorganic particles. For example, the particles can be silica, zirconium oxide or alumina particles. The particles can have any shape that may be desirable or available in an application. For example, the particles can have a regular or irregular shape. For example, the particles can be approximately spherical. As another example, the particles can be elongated. In such embodiments, the low refractive index layer includes a plurality of elongated particles. In some embodiments, the elongated particles have an average aspect ratio that is not less than about 1.5, or not less than about 2, or not less than about 2.5, or not less than about 3, or not less than about 3.5, or not less than about 4, or not less than about 4.5, or not less than about 5. In some embodiments, the particles can be in the form or shape of a string-of-pearls (such as Snowtex-PS particles available from Nissan Chemical, Houston, Tex.) or aggregated chains of spherical or amorphous particles, such as fumed silica.

The particles may or may not be functionalized. In some embodiments, the particles are not functionalized. In some embodiments, the particles are functionalized so that they can be dispersed in a desired solvent or binder with no, or very little, clumping. In some embodiments, the particles can be further functionalized to chemically bond to the binder. For example, the particles can be surface modified and have reactive functionalities or groups to chemically bond to binder. In such embodiments, at least a significant fraction of the particles is chemically bound to the binder. In some embodiments, particles do not have reactive functionalities to chemically bond to the binder. In such embodiments, the particles can be physically bound to the binder, or the binder can encapsulate particles.

In some embodiments, some of the particles have reactive groups and others do not have reactive groups. For example in some embodiments, about 10% of the particles have reactive groups and about 90% of the particles do not have reactive groups, or about 15% of the particles have reactive groups and about 85% of the particles do not have reactive groups, or about 20% of the particles have reactive groups and about 80% of the particles do not have reactive groups, or about 25% of the particles have reactive groups and about 75% of the particles do not have reactive groups, or about 30% of the particles have reactive groups and about 60% of the particles do not have reactive groups, or about 35% of the particles have reactive groups and about 65% of the particles do not have reactive groups, or about 40% of the particles have reactive groups and about 60% of the particles do not have reactive groups, or about 45% of the particles have reactive groups and about 55% of the particles do not have reactive groups, or about 50% of the particles have reactive groups and about 50% of the particles do not have reactive groups. In some embodiments, some of the particles may be functionalized with both reactive and unreactive groups on the same particle.

The ensemble of particles may include a mixture of sizes, reactive and non-reactive particles and different types of particles, for example, organic particles including polymeric particles such as acrylics, polycarbonates, polystyrenes, silicones and the like; or inorganic particles such as glasses or ceramics including, for example, silica and zirconium oxide, and the like.

The binder can be or include any material that may be desirable in an application. For example, the binder can be a curable material that forms a polymer, such as a cross-linked polymer. In general, the binder can be any polymerizable material, such as a polymerizable material that is radiation-curable, such as a UV curable material.

The low refractive index layer can be produced using any method that may be desirable in an application. In some embodiments, the low refractive index layer can be produced by the processes described in co-pending application titled "PROCESS AND APPARATUS FOR A NANOVOIDED ARTICLE", U.S. Ser. No. 61/169,429, co-pending application titled "PROCESS AND APPARATUS FOR COATING WITH REDUCED DEFECTS", U.S. Ser. No. 61/169,427, and co-pending application titled "PROCESS FOR GRADIENT NANOVOIDED ARTICLE", U.S. Ser. No. 61/254,674, the disclosures of which are incorporated in their entirety herein by reference.

By controlling the polymerization, drying, and cure environment, the morphology can be controlled. The process may also utilize a controlled environment region between the coating station and polymerization apparatus, as described elsewhere. This region enables improved control of the coated film composition and environment. The polymerization apparatus can be located anywhere between the coating station and dryer. Controlling the environment during polymerization is also advantageous. The polymerized coating is subsequently dried and may be further post-processed with, for example, conventional UV radiation systems to further cure the material. Radiation sources that could be used in the polymerization apparatus include LEDs, UV lasers, UV lamps, and e-beam).

In some embodiments, after the polymerization step, the solvent may still include some of the polymerizable material, although at a lower concentration. Next, the solvent is removed by drying or evaporating the solution resulting in a low refractive index layer that includes a network, or a plurality, of voids dispersed in a polymer binder. The low refractive index layer further includes a plurality of particles dispersed in the polymer. The particles are bound to the binder, where the bonding can be physical or chemical, or be encapsulated by the binder.

The low refractive index layer can have other materials in addition to the binder and particles. For example, the low refractive index layer can include one or more additives, such as for example, coupling agents, to help wet the surface of a substrate, not expressly shown herein, on which the low refractive index layer is formed. As another example, the low refractive index layer can include one or more colorants, such a carbon black, for imparting a color, such as the black color, to the low refractive index layer. Other exemplary materials in low refractive index layer can include initiators, such as one or more photo-initiators; anti-stats; adhesion promoters; surfactants; UV absorbers; release agents; or others, as described elsewhere. In some embodiments, the low refractive index layer can include a down converting material that is capable of absorbing light and reemitting a longer wavelength light. Exemplary down converting materials include phosphors.

In general, the low refractive index layer can have a range of desirable porosities for any weight ratio of the binder to plurality of the particles. Accordingly, in general, the weight ratio can be any value that may be desirable in an application. In some embodiments, the weight ratio of binder to plurality of particles is not less than about 1:2.5, or not less than about 1:2.3, or not less than about 1:2, or not less than (or is greater than) about 1:1, or not less than about 1.5:1, or not less than about 2:1, or not less than about 2.5:1, or not less than about 3:1, or not less than about 3.5:1, or not less than about 4:1, or not less than about 5:1. In some embodiments, the weight ratio is in a range from about 1:2.3 to about 4:1.

In some embodiments, the top major surface of low refractive index layer can be treated to, for example, improve the adhesion of the low refractive index layer to another layer. For example, the top surface can be corona treated.

Surface modification of the particles can be accomplished in a variety of known ways, such as those described in U.S. patent application Ser. No. 11/027,426, filed Dec. 30, 2004, and U.S. Pat. No. 6,376,590, which is incorporated herein by reference.

Additional exemplary particles are described in U.S. patent application Ser. No. 61/169,466 entitled "OPTICAL FILM," filed on Apr. 15, 2009. In some embodiments, the particles in the low index refractive layer can be approximately spherical or elongate.

In some embodiments, the low refractive index layers or material has a BET porosity that is greater than about 40% (which corresponds to a surface area of about 50 $m^2/g$ as determined by the BET method), porosity greater than about 50% (which corresponds to a surface area of about 65-70 $m^2/g$ as determined by the BET method), greater than about 60% (which corresponds to a surface area of about 80-90 $m^2/g$ as determined by the BET method), and most preferably between about 65% and about 80% (which corresponds to a surface area of values greater than about 100 $m^2/g$ and about 220 $m^2/g$ as determined by the BET method). In some embodiments, the volume fraction of the plurality of interconnected voids in the low refractive index layer is not less than (or is greater than) about 20%, or greater than about 30%, or greater than about 40%, or greater than about 50%, or greater than about 60%, or greater than about 70%, or greater than about 90%. The BET surface area and percent porosity values will be dictated by the need to balance the low refractive index and other critical performance properties such as cohesive strength of the coating. As used herein, the term "BET method" refers to the Brunauer, Emmett, and Teller surface area analysis (See S. Brunauer, P. H. Emmett and E. Teller, *J. Am. Chem. Soc.*, 1938, 60, 309). The BET method is a well-known, scientifically validated method used to determine pore size, surface area, and percent porosity of a solid substance. BET theory relates to the physical adsorption of gas molecules on a solid surface and serves as the basis for obtaining physical information about the surface area and porosity of a solid surface.

The retroreflective articles of the present disclosure can have any desired optical haze. In some embodiments, low refractive index layer 960 has an optical haze that is not less than (or is greater than) about 20%, or greater than about 30%, or greater than about 40%, or greater than about 50%, or greater than about 60%, or greater than about 70%, or greater than about 80%, or greater than about 90%, or greater than about 95%. In some embodiments, the low index refractive layer has a low optical haze. For example, in some embodiments, the optical haze of the low index refractive layer is less than about 20%, less than about 7%, less than about 5%, less than about 3%, less than about 2%, less than about 1.5%, or less than about 1%.

The low index refractive layer can be formed by any suitable method, such as slot coating, direct and indirect gravure coating, knife coating, Mayer rod coating, and roll coating, also in for example, automated web-to-web coating processes. In some embodiments, low refractive index layer 120 is coated on structured surface 114. As used herein, the term "coated" can mean planarized or conformal. Coated is meant to point to the method of application (e.g., knife coated, die coated, gravure coated, slide coated, ink jet printed, etc.).

The retroreflective articles of the present disclosure display improved ply adhesion and/or improved water resistance. Improved ply adhesion and water resistance provides greater utility of porous low index for retroreflective sheetings by increasing the durability and weatherability of the retroreflective articles. Preferably the addition of a protective layer (e.g., an adhesive layer) behind the cells provides a fully enclosed and encapsulated cell. Additionally, with appropriate choice of materials, size, and/or spacing, the retroreflective articles of the present disclosure may have a more uniform appearance than can be attained with conventional retroreflective articles including a sealing film. Additionally, the retroreflective articles of the present disclosure do not require the inclusion or use of a sealing film, reducing their cost. In some embodiments, the printed areas are small enough so that they do not adversely affect the aesthetics of artwork or design printed on the surface of the retroreflective article or construction. These methods and constructions also allow printed areas of arbitrary shape and color to be created. Consequently, retroreflective articles with a white appearance can be formed as well as articled with an anti-moire effect and/or security features. Lastly, the manufacturing process is streamlined because the vapor coat step is removed from the process. In some embodiments, the angular distribution of light has changed. For example, some embodiments show increased brightness loss at low angles compared to higher angles, which may be advantageous in some instances.

Further, the retroreflective articles of the present disclosure have improved performance when compared to beaded sheeting. Prismatic sheeting is known in general to retroreflect a higher percentage of the incident light back towards the source when compared to glass bead based sheeting. (See, e.g., FIGS. 2 and 3 of "Driver-Focused Design of Retroreflective Sheeting for Traffic Signs", Kenneth Smith, 87th Annual Meeting of Transportation Research Board, Jan. 13-17, 2008, Washington, D.C.). When the retroreflected light is properly positioned with respect to observation angle, the result is a product with superior brightness and performance.

The low refractive index layers, coatings, and materials and the retroreflective articles and constructions described herein can be incorporated into retroreflective devices such as those used in reflective signs, license plates, and advertising displays. The articles and constructions described herein produce highly reflective devices that have a coefficient of retroreflection (Ra) from 40 to greater than 200 candle power when measured according to the methods described herein. In addition, the optically diffuse low index constructions are also useful in semi-specular devices which require both high reflection and diffuse specular characteristics.

The following examples describe some exemplary constructions of various embodiments of the retroreflective sheetings, forms, and methods of making the retroreflective sheeting and forms described in the present application. The following examples are intended to be illustrative, but are not intended to limit the scope of the present application.

EXAMPLES

The following description was used in preparing Examples 1 through 7. A retroreflective layer was prepared by casting cube-corner microstructures onto an overlay film, as described in U.S. Pat. No. 5,691,846 (Benson), incorporated herein by reference. A retroreflective optical construction was prepared by coating at least some of the cube-corner microstructures with a low refractive index composition or material, forming a low refractive index layer. Alternatively, a low index material could be laminated to the cube corner microstructures. A sealing layer was provided by printing onto at least a portion of the low refractive index layer.

Low index coating compositions are described below in Coating Solutions 1-3. Exemplary retroreflective optical constructions prepared according to the present disclosure are described in Examples 1-7.

An overlay film was made by casting ethylene acid acrylate (EAA) (commercially available under the trade designation "Primacor 3440" from Dow Company of Midland, Mich.) at a film at a thickness of 0.01 cm (4 mil) onto a corona treated polyethylene terephthalate (PET) carrier approximately 53 in (134.6 cm) wide and 0.05 mm (0.002 in) thick. Pellets of EAA were fed into a 1.9 cm (¾ in) single screw extruder available from C.W. Brabender Instruments Inc., South Hackensack, N.J. The extruder temperature profile was from 140° C. (284° F.) to 175° C. (347° F.), resulting in a melt temperature of about 175° C. (347° F.). As the molten resin exited the extruder, it passed through a horizontal die (commercially available under the trade designation "Ultraflex-40" from Extrusion Dies Industries LLC, Chippewa Falls, Wis.) and was cast onto the PET carrier described above. The PET carrier was traveling at approximately 36 meters/min (120 ft/min). The resulting molten overlay film on the PET carrier was run between a rubber roll and a chilled steel backup roll to solidify the molten resin into a layer. The EAA surface was corona treated at 1.5 J/cm$^2$.

The resulting cube-corner structure had three sets of intersecting grooves with a pitch or primary groove spacing of 81.3 microns (0.0032 inch). The intersecting grooves formed a cube-corner base triangle with included angles of 61, 61, and 58 degrees and a cube-corner element height of 37.6 microns (0.00148 inch). The primary groove spacing is defined as the groove spacing between the grooves which form the two 61 degree base angles of the base triangle.

The cube-corner microstructures were prepared using a resin composition formed by combining 25 wt-% bisphenol A epoxy diacrylate (commercially available under the trade designation "Ebecryl 3720" from Cytek, Woodland Park, N.J.), 12 wt-% dimethylaminoethyl acrylate ("DMAEA"), 38 wt-% TMPTA (trimethylol propane triacrylate) and 25 wt-% 1,6 HDDA (hexanediol diacrylate). The formulation had 0.5 pph of TPO (2,4,6-trimethylbenzoyl diphenylphosphine oxide) photoinitiator.

The resin composition was cast at room temperature at 25 fpm onto a metal tool heated to 77° C. (170° F.). The resin composition filled the cavities of the cube-corner microstructures in the tool via a rubber nip roller having a gap set to fill the cavities of the embossed pattern on the tool and minimize the amount of resin on the land area of the tool. A retroreflective layer was made by contacting the corona treated EAA film/PET carrier with the cube-corner microstructures of the resin. The cube-corner microstructure resin was cured through the PET carrier/EAA film on the tool with twelve Fusion D UV lamp (available from Fusion Systems, Rockville, Md.) set at 600 W/in. Dichroic filters were used in front of the UV lamps to minimize IR heating of the construction. Upon completion of the curing process and removal of the retroreflective layer from the tool, the cube-corner microstructures were irradiated by a Fusion D UV lamp operating at 50% to provide a post-UV irradiation cure. The retroreflective layer was passed through an oven set at 127° C. (260° F.) to relax the stresses in the film.

Coating Solution 1:

A low refractive index composition was prepared using a non-surface modified, alkaline stabilized dispersion of silica (commercially available under the trade designation "Cabo-Sperse PG002" from Cabot of Bellerica, Mass.) and solids polyvinyl alcohol (PVA) (commercially available under the trade designation "Poval 235" from Kuraray USA). To a 400 ml plastic beaker were added 138.8 g of a 7.2% solids PVA water solution, 1.0 g of a nonionic surfactant (commercially available under the trade designation" Tergitol Min-Foam 1X" from Dow Chemical Company, Midland, Mich.), and 1 ml of a concentrated NH4OH solution. The solution was mixed at low shear using an air powered overhead laboratory mixer operating at low speed. The pH of the solution was about 10.3. Silica dispersion (200 g) was then added to the solution. The blend was allowed to mix for approximately 15 minutes, and the pH was adjusted by the slow addition of a solution of 5% HCl until a pH of 9.5 to 9.8 was obtained. The blend, comprising 1 part of PVA to 4 parts silica on a dry weight basis, was then transferred to a 1 L round bottom flask and placed on a rotary evaporator at a temperature of about 40° C. and 600 mmHg vacuum. The final solids content of the low index coating composition was adjusted to 14.5%.

Coating Solution 2:

A low index coating solution was prepared using Cabo-Sperse™ 2020 K silica dispersion available from Cabot of Bellerica, Mass. This is a non-surface modified, alkaline stabilized dispersion of M-5 silica. This silica is characterized by its medium surface area which is typically about 120-150 $m^2/g$. In a typical process, 150 g of 7.2 wt % PVA 235 solution was charged to 1000 ml plastic beaker (10.8 g PVA 235 on a dry weight basis) followed by the addition of 2.0 g of 10 wt % Tergitiol Min-Foam 1X and 1 ml of concentrated $NH_4OH$ soln. These components were mixed thoroughly with a stirring rod. After these components were mixed completely, 486 g of Cabo-Sperse™ 2020 K, 20 wt % in water was added followed by the addition of 445 g of DI water. The components were mixed at low shear using a hand mixer or an air driven mixer at low rpms. The final solids were adjusted to 10% wt to produce a mixture comprised on a dry weight basis 1 part of PVA resin to 9 parts silica (1:9 PVA-Si ratio, 20% PVA by weight). Once these components were mixed, the solution was then transferred to a 1 L, 1-neck round bottom flask and placed on a Roto-Vap at 40° C. and 600 mmHg. The final solids content of the coating mixture was 10.3%.

Coating Solution 3:

A low refractive index coating solution comprising a boric acid crosslinking system was prepared. To a 400 ml plastic beaker equipped with an air driven laboratory mixer and a heating mantel were added 100 g of a silica dispersion (commercially available under the trade designation "Cabo-Sperse PG 022" from Cabot, Bellerica, Mass.). The silica dispersion was gently agitated and warmed to 45-50° C. When the dispersion had equilibrated in this temperature range, 14 g of a pre-warmed 5 wt % aqueous boric acid solution (available from Aldrich, corresponding to 0.7 g boric acid or 0.035 g boric acid/g silica) was added to the silica dispersion and was mixed for about 30 min. After this time, 2 g of a low foaming surfactant (10 wt % Tergitiol Min-Foam 1X, available from Dow Chemical, Midland, Mich.) was added to the silica-boric acid mixture followed by the addition of 3.36 g of polyvinyl alcohol. The PVA was added as 46.3 g of an aqueous 7.2 wt % solution. Upon addition of the PVA solution, the mixture became very viscous and an additional 87 g of deionized water added to reduce the viscosity and ensure adequate mixing. The mixture was gently agitated for an additional 20 min. After this time, the coating solution was transferred to a 1 L, 1-neck round bottom flask and placed on a Roto-Vap at 40° C. and 600 mmHg vacuum. The final solids content of the solution was 10.2%. The final mixture had a pH in the range of 4.2-4.5 and comprised on a dry weight basis 1 part PVA resin to 6 parts PG022 silica (1:6 PVA-Si ratio, 14.3% PVA by weight).

Comparative Example A

A retroreflective optical construction was prepared by knife coating Coating Solution 1 onto the cube-corner microstructures of the retroreflective layer using an automatic coating line equipped with an 18 in (45.7 cm) wide knife bar set to a 0.004" (0.10 mm) gap. The retroreflective layer was placed on a moving web set to a constant line speed of 50 fpm (15.1 m/min), with the cube-corner microstructures facing upward. Approximately 250 g of Coating Solution 1 was manually poured onto the cube-corner microstructures, and the wet coating was gradually dried in a 5-zone 125 foot (38 m) oven. The first oven zone was set at 100° F. (37.7° C.) and the remaining four zones were set at 180° F. (82.2° C.).

Examples 1-2

A retroreflective optical construction was prepared as described in Comparative Example A, wherein a low index coating solution was coated onto cube-corner microstructures.

The retroreflective optical construction was converted into 9 in by 14 in (22.8×57.9 cm) samples. Printed constructions were prepared by printing different patterns onto the low index layer to cover different areas of the layer as shown in FIG. 2, using a UV inkjet printer (commercially available under the trade designation "PressVu UV 200 printer" from VUTEk Inc.,) and inkjet black ink (commercially available under the trade designation "3M Piezo Ink Jet Ink Series 2200UV" from 3M Company, St. Paul, Minn.). The printer was run in double strike mode with a resolution of 363×600 dpi.

A first printing pattern consisted of vertical lines. The lines were 0.1 mm thick and equally distanced from each other by 1.3 mm. Area coverage of the first printing pattern was about 33%. A second printing pattern was similar to the first printing pattern except that the lines were 0.2 mm thick and separated by 1.3 mm. Area coverage of the second printing pattern was about 66%

A 5 in by 7 in (12.7 cm by 17.8 cm) area was printed on the sample and a small 2 in by 4 in (5 cm by 10.1 cm) test strip was cut from the printed sample. Black ink was used; however it is possible to use any color ink that may match the particular background of a road sign or license plate.

A radiation-polymerizable pressure sensitive adhesive (PSA) was prepared as described in U.S. Pat. No. 5,804,610 (Hamer), incorporated herein by reference. The PSA composition was made by mixing 95 parts by weight isooctyl acrylate (IOA), 5 parts by weight acrylic acid (AA), 0.15 parts by weight Irgacure 651 (commercially available from Ciba Corporation, now a BASF Company, N.J.), 0.05 parts by weight isooctylthioglycolate (IOTG), and 0.4 parts by weight Irganox 1076 (commercially available from Ciba Corporation). The PSA composition was placed into packages made of a ethylene vinyl acetate copolymer film of 0.0635 mm thickness (commercially available under the trade designation "VA-24" from Pliant Corporation, Dallas, Tex.) measuring approximately 10 cm by 5 cm and heat sealed. The PSA composition was polymerized. About 25 parts of a tackifying resin (commercially available under the trade designation "Foral 3085" from Hercules Inc., Wilmington Del.) were added to an extruder along with 75 parts of the PSA composition and cast as a film onto a silicone release liner at a thickness of 2 mil (0.005 cm), as is generally described in Example 46 of U.S. Pat. No. 5,804,610, which is herein incorporated by reference. The PSA film was subjected to a second polymerization process. The PSA film was then laminated to the retroreflective optical construction using a hand squeeze roll laminator, wherein the adhesive contacted the patterned cube corner microstructures to provide a seal.

The printed test strips were laminated to an anodized aluminum plate the PSA film. The construction was allowed to equilibrate at 75° F. (23.9 C) and 50% relative humidity for 72 hrs. Adhesion peel tests were conducted using an I-Mass SP-2000 peel tester equipped with a 5 kg load cell. A peel rate of 12 in/min (30.5 cm/min) was used for a length of 1 in (2.54 cm). The first 0.5 seconds of the data collected were discarded and the remaining data were averaged and the values are reported in Table 1, below.

Retroreflectivity ($R_A$) was measured according to ASTM E810-03 at an observation angle of 0.2, entrance angle of −4 degrees and 0 and 90 degrees orientation. Adhesion and retroreflectivity for Comparative Example A, and Examples 1-2 are shown in Table 2, below.

TABLE 2

Retroreflectivity and Adhesion of Examples 1-2.

| | Retroreflectivity (cd/lux · m$^2$) Orientation (degrees) | | Adhesion |
| --- | --- | --- | --- |
| | 0 | 90 | (g/in) [g/cm] |
| Comp. Ex. A | 120 | 118 | 342 [134] |
| Example 1 | 92 | 86 | 880 [346] |
| Example 2 | 64 | 60 | 918 [361] |

Examples 3-6

Coating Solution 2 was coated onto a 8 in by 12 in (20 cm by 30 cm) retroreflective layer using a U.S. No. 40 Meyer Rod (designed to produce a wet film thickness of about 3 mils) by securing the retroreflective layer onto a rubber mat, applying the coating solution near one edge of the sheeting, and slowly drawing the Meyer rod by hand over the solution while applying slight downward pressure. After the retroreflective layer was coated with the solution, the wet coating was allowed to dry at room temperature and then placed in an air circulating oven at 158° F. (70° C.) for 10 min.

The coated retroreflective layer was printed with a UV inkjet printer (model "JF-1631" commercially available from Mimaki, Suwanee, Ga.). The printer was run using 8 passes, unidirectional printing, with the lamps set on High, and with a 600×600 dpi resolution. Yellow inkjet ink (commercially available from Mimaki) was used. A printing pattern comprising dots disposed in a rhomboid parallelogram shape, wherein each dot was centered in the vertex of the parallelogram, as schematically shown in FIG. 3, was used. Radius of the dots ranged from 400 to 600 μm, the distance between the centers of horizontally adjacent dots was "S", and the distance between the centers of vertically adjacent dots was "S"/2. "S" ranged from 1064 to 1585 μm. Coverage area (% area) was calculated based on the relative amounts of printed and unprinted areas. Details on the patterns used to print coated retroreflective optical constructions (Examples 3-6) are shown in Table 3, wherein R is the size of the circles in microns, and S is the spacing between the circles in microns. The area surrounding the circles was printed and the circles themselves were not printed. Ink laydown levels of 100% and 200% were used.

TABLE 3

Printing patterns used in Examples 3-6.

| Pattern | S (μm) | R (μm) | % area printed |
| --- | --- | --- | --- |
| 1 | 1064 | 300 | 50% |
| 2 | 1418 | 400 | 50% |
| 3 | 1585 | 400 | 60% |
| 4 | 1294 | 400 | 40% |

A PSA film was prepared as described in Examples 1-2 and laminated to the printed samples using a hand squeeze roll laminator with a lamination pressure of about 60 psi. After laminating the pressure sensitive adhesive, 1 in (2.54 cm) wide test strips of the samples were cut. The release liner of the PSA film was removed from the test strips and the samples were laminated to an aluminum substrate using a hand roller. The samples were allowed to equilibrate overnight. Adhesion was measured using a 90 degree peel test using a tester (commercially available as Sintech Testing Device, from Sintech) equipped with a 22.5 lbf load cell and a sliding stage used to maintain a 90 degree-peel angle. The peel rate used was 2 in/min. The average force to peel the sample was determined and the results are tabulated in Table 4, below.

TABLE 4

Average Peel Force of Examples 3-6

| sample | S (μm) | R (μm) | % printed area | Ink level (%) | Peel force (lbf) |
| --- | --- | --- | --- | --- | --- |
| Comparative Example A | — | — | — | — | 0.7 |
| Example 3 | 1064 | 300 | 50% | 100% | 1.1 |
| Example 4 | 1418 | 400 | 50% | 200% | 2.3 |
| Example 5 | 1585 | 400 | 60% | 200% | 3.3 |
| Example 6 | 1294 | 400 | 40% | 200% | 2.3 |

Retroreflectivity was measured at an observation angle of 0.2 degrees, entrance angle of −4 degrees, and 0 and 90 degrees orientation. Retroreflectivity is shown in Table 5, below, as an average retroreflectivity between 0 and 90 degrees orientation.

TABLE 5

Retroreflectivity of Examples 3-6.

| | Obs. angle/ent. angle (degrees) | | |
| --- | --- | --- | --- |
| | 0.2/−4 | 1/4 | 2/4 |
| Comparative Example A | 201.0 | 88.0 | 16.9 |
| Example 3 | 65.9 | 62.8 | 26.8 |
| Example 4 | 52.7 | 43.8 | 17.4 |
| Example 5 | 63.2 | 37.8 | 9.3 |
| Example 6 | 60.3 | 54.4 | 21.5 |

Comparative Example B and Example 7

Comparative Example B and Example 7 were prepared by coating samples of retroreflective layer (8 in by 12 in (20 cm by 30 cm)). Retroreflective layers were nitrogen corona treated at 0.5 mJ/cm² prior to coating. Coating solution 3 was coated onto the retroreflective layers using a U.S. No. 45 Meyer Rod, as described in Examples 1-2.

The coated retroreflective layer was printed with the UV inkjet printer, as described in Examples 1-2, except that the printing pattern comprised 200 µm wide perpendicular lines printed in a grid pattern. The lines were spaced 700 µm apart (from center to center). The calculated % unprinted area was approximately 51%. An ink laydown level of 200% was used.

Retroreflectivity was measured at observation angles of 0.2, 1 and 2 degrees, entrance angle of −4 degrees, and 0 and 90 degrees orientation. Retroreflectivity is shown in Table 6, below, as an average retroreflectivity between 0 and 90 degrees orientation.

TABLE 6

Retroreflectivity of Comparative Example B and Example 7.

| | Obs. angle/ent. angle (degrees) | | |
|---|---|---|---|
| | 0.2/−4 | 1/4 | 2/4 |
| Comparative Example B | 177 | 97 | 24 |
| Example 7 | 90 | 67 | 21 |

Example 7

Example 7 exhibited better water resistance when submitted to a water soak test when compared with Comparative Example B, which exhibited obvious water encroachment after five minutes of water soaking.

The recitation of all numerical ranges by endpoint is meant to include all numbers subsumed within the range (i.e., the range 1 to 10 includes, for example, 1, 1.5, 3.33, and 10).

Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following claims.

What is claimed is:

1. A retroreflective article, comprising:
   a retroreflective layer including multiple cube corner elements that collectively form a structured surface that is opposite a major surface;
   a low refractive index material adjacent to at least a portion of the structured surface, the low refractive index material including pores and having an effective index of refraction that is less than about 1.3; and
   a printable material disposed on a portion of the low refractive index material.

2. The retroreflective article of claim 1, wherein the low refractive index material is adjacent to substantially all of the structured surface.

3. The retroreflective article of claim 1, wherein the low refractive index material has a refractive index greater than about 1.1.

4. The retroreflective article of claim 1, wherein the printable material at least partially fills at least some of the pores in the low refractive index material.

5. The retroreflective article of claim 4, wherein the printable material is in intimate contact with the structured surface.

6. The retroreflective article of claim 1, wherein the printable material is one of transparent, opaque, and colored.

7. The retroreflective article of claim 1, wherein the printable material is one of a radiation curable composition, a solvent based polymer solution, and a UV curable composition.

8. The retroreflective article of claim 1, wherein the printable material is disposed on the portion of the low refractive index material by one of ink jet printing, flexographic printing, gravure printing, screen printing, transfer printing, and offset printing.

9. The retroreflective article of claim 1, wherein the printable material is disposed on at least 50% of the structured surface.

10. The retroreflective article of claim 1, wherein the printable material is disposed in a pattern to create enclosed cells.

11. The retroreflective article of claim 10, further including a protective layer that encapsulates the enclosed cells.

12. The retroreflective article of claim 10, where the enclosed cells each have a cell size that is less than 1000 microns.

13. The retroreflective article of claim 1, wherein the low refractive index layer is encapsulated with an additional protective layer.

14. A retroreflective article, comprising:
   a retroreflective layer including multiple cube corner elements that collectively form a structured surface that is opposite a major surface;
   a low refractive index material adjacent to at least a portion of the structured surface to form an optically active area which retroreflects incident light, the low refractive index material including pores; and
   a printable material disposed on a portion of the low refractive index material to form an optically inactive area that does not substantially retroreflect incident light.

15. The retroreflective article of claim 14, wherein the printable material has an effective refractive index that is greater than about 1.3.

16. The retroreflective article of claim 14, wherein the low refractive index material is adjacent to substantially all of the structured surface.

17. The retroreflective article of claim 14, wherein the low refractive index material has a refractive index that is between about 1.1 and about 1.3.

18. The retroreflective article of claim 14, wherein the printable material at least partially fills at least some of the pores in the low refractive index material.

19. The retroreflective article of claim 14, wherein the printable material is directly adjacent to the structured surface.

20. The retroreflective article of claim 14, wherein the printable material is one of transparent, opaque, and colored.

21. The retroreflective article of claim 14, wherein the printable material is one of a radiation curable composition, a solvent based polymer solution, and a UV curable composition.

22. The retroreflective article of claim 14, wherein the printable material is disposed on the portion of the low refractive index material by one of ink jet printing, flexographic printing, gravure printing, screen printing, transfer printing, and offset printing.

23. The retroreflective article of claim 14, wherein the printable material is disposed on at least 50% of the structured surface.

24. The retroreflective article of claim 14, wherein the printable material is disposed in a pattern to create enclosed cells.

25. The retroreflective article of claim 24, further including a protective layer that encapsulates the enclosed cells.

26. The retroreflective article of claim 24, where the enclosed cells each have a cell size that is less than 1000 microns.

27. The retroreflective article of claim 14, wherein the low refractive index layer is encapsulated with an additional protective layer.

28. A method of forming a retroreflective article, comprising:
   providing a retroreflective layer including a structured surface that is opposite a major surface; and
   applying a low refractive index material adjacent to at least a portion of the structured surface, the low refractive index material including pores and having an effective index of refraction that is below about 1.3; and
   printing a material on a portion of the low refractive index material.

29. The method of claim 28, wherein the printed material has an effective refractive index that is greater than about 1.3.

30. The method of claim 28, wherein the low refractive index material is adjacent to substantially all of the structured surface.

31. The method of claim 28, wherein the low refractive index material has a refractive index that is greater than about 1.1.

32. The method of claim 28, wherein the printed material at least partially fills at least some of the pores in the low refractive index material.

33. The method of claim 28, wherein the printed material is directly adjacent to the structured surface.

34. The method of claim 28, wherein the printed material is one of transparent, opaque, and colored.

35. The method of claim 28, wherein the printed material is one of a radiation curable composition, a solvent based polymer solution, and a UV curable composition.

36. The method of claim 28, wherein the printed material is printed on the portion of the low refractive index material by one of ink jet printing, flexographic printing, gravure printing, screen printing, transfer printing, and offset printing.

37. The method of claim 28, wherein the printed material is printed on at least 50% of the structured surface.

38. The method of claim 28, wherein the printed material is printed in a pattern to create enclosed cells.

39. The method of claim 38, further comprising:
   applying a protective layer to the low refractive index layer to encapsulate the cells.

40. The method of claim 38, wherein the enclosed cells each have a cell size that is less than 1000 microns.

41. A retroreflective article comprising:
   a retroreflective layer including multiple cube corner elements that collectively form a structured back surface that is opposite a major front surface;
   a low refractive index material adjacent to at least a portion of the structured back surface, the low refractive index material having an effective index of refraction that is less than about 1.3; and
   a printable material disposed on a portion of the low refractive index material.

42. The retroreflective article of claim 41, wherein the low refractive index material includes pores.

43. The retroreflective article of claim 42, wherein the printable material at least partially fills at least some of the pores in the low refractive index material.

* * * * *

UNITED STATES PATENT AND TRADEMARK OFFICE
CERTIFICATE OF CORRECTION

PATENT NO. : 8,746,902 B2
APPLICATION NO. : 13/264347
DATED : June 10, 2014
INVENTOR(S) : Suman K. Patel et al.

It is certified that error appears in the above-identified patent and that said Letters Patent is hereby corrected as shown below:

ON THE TITLE PAGE, ITEM (56)

Column 2

Line 7, delete "Lafayett," and insert -- Lafayette, --, therefor.

Column 2

Line 16, delete "naturalpigments.comleducationlarticle" and insert -- naturalpigments.com/education/article --, therefor.

IN THE SPECIFICATION

Column 4

Line 8, delete "oligimers," and insert -- oligomer, --, therefor.

Column 7

Line 60, delete "triacryalate." and insert -- triacrylate. --, therefor.

Column 8

Line 22, delete "Cabo-Sie™" and insert -- Cabo-Sil™ --, therefor.

Column 8

Line 32, delete "Carbo-Sperse™" and insert -- Cabo-Sperse™ --, therefor.

Signed and Sealed this
Tenth Day of March, 2015

Michelle K. Lee
*Deputy Director of the United States Patent and Trademark Office*

Column 9

Line 3, delete "isocynanate," and insert -- isocyanate, --, therefor.

Column 9

Line 5, delete "alkloxy," and insert -- alkyloxy, --, therefor.

Column 10

Line 35, delete "where as" and insert -- whereas --, therefor.

Column 17

Line 5, delete "Bellerica," and insert -- Billerica, --, therefor.

Column 17

Line 27, delete "Bellerica," and insert -- Billerica, --, therefor.

Column 17

Line 33, delete "Tergitiol" and insert -- Tergitol --, therefor.

Column 17

Line 52, delete "Bellerica," and insert -- Billerica, --, therefor.

Column 17

Line 59, delete "Tergitiol" and insert -- Tergitol --, therefor.

Column 18

Line 46, delete "66%" and insert -- 66%. --, therefor.